United States Patent [19]

O'Neill

[11] 4,117,070
[45] Sep. 26, 1978

[54] PROCESS FOR PREPARING CALCINED GYPSUM

[75] Inventor: Eugene Edward O'Neill, Okeene, Okla.

[73] Assignee: United States Gypsum Company, Chicago, Ill.

[21] Appl. No.: 777,213

[22] Filed: Mar. 14, 1977

[51] Int. Cl.² .......................... B32B 13/00; B28B 3/00
[52] U.S. Cl. ...................................... 264/234; 156/39;
    264/333; 264/345; 264/349
[58] Field of Search ............... 264/86, 333, 349, 234,
    264/345; 156/39, 43, 45; 259/146, 148, 153, 164

[56] References Cited
U.S. PATENT DOCUMENTS 2,088,813  8/1937  Roos .................................. 156/39 X
3,972,972  8/1976  Yano .................................. 264/117

Primary Examiner—Thomas P. Pavelko
Attorney, Agent, or Firm—Robert H. Robinson; Kenneth E. Roberts

[57] ABSTRACT

An improved process for producing calcined gypsum which comprises continuously treating a mass of calcined gypsum by adding, with thorough blending agitation, small metered portions of water to result in the incorporation of about 1–8% free water in the mass by weight of the gypsum, allowing the blended mass to heal the calcium sulfate hemihydrate surface fissures and thereafter continuously supplying the treated gypsum mass into gypsum board production.

11 Claims, 2 Drawing Figures

PROCESS FOR PREPARING CALCINED GYPSUM

BACKGROUND OF THE INVENTION

This invention relates to an improved calcined gypsum whose properties in general and specifically set time, pouring consistency, potential for strength development and other properties are particularly adapted for use in gypsum board manufacture. The invention also relates to a process for continuously treating calcined gypsum to produce a healed calcium sulfate hemihydrate having properties of low water demand, obtaining significant energy savings, yet retaining other properties suitable for the use in gypsum board production.

Continuous calcination of gypsum, such as disclosed in Blair U.S. Pat. No. 3,236,509, is of importance in the economical production of gypsum stucco (calcium sulfate hemihydrate) especially adapted for use in gypsum board manufacture. The properties required of gypsum stucco used in gypsum board manufacture on modern automatic machinery differs substantially from the properties required for so-called bag plaster usually made in kettles operated by batch techniques. It has been found that stucco produced by the continuous process differs principally from batch process stucco in aging and setting properties. Because the continuously produced stucco is not going to be stored for any appreciable period of time, but rather is going to be utilized in gypsum board manufacture in a matter of a couple of days if not immediately, the material does not need to exhibit long-term age stability.

In automated gypsum board manufacture a large portion of the processing time and processing energy is devoted to removing excess water from the wet board. Considerable excess water is required in gypsum board manufacture to properly fluidize the calcined gypsum and obtain proper flow of the gypsum slurry. Thus, calcined gypsum made by continuous calcination will have a dispersed consistency of about 120–200 cc. This relates to a water usage of 85–100 parts of water per 100 parts of the calcined gypsum in a modern automated gypsum board plant. The theoretical water required to convert the calcined gypsum calcium sulfate hemihydrate to set gypsum dihydrate is only 18.7% by weight on a pure basis. This leaves about 67% to about 82% of the water which must be removed in drying the board.

For a considerable time the art has sought to reduce the cost and increase the line speed in the manufacture of gypsum board. One such manner, if effective practical means could be found, would be to reduce the amount of water demanded to properly fluidize the calcined gypsum required for automatic board production. That is if the water demand required for dispersed consistency could be reduced approximately 20–50%, then there would be corresponding less free water to be removed from the wet slurry of the board. This effectively would lower energy required in drying a given volume of wet board and allow either less time in the drying ovens, lower temperatures to effectuate complete drying in the ovens, or both.

Methods of producing artificially aged or low consistency kettle stucco have been accomplished using batch kettle operations. Thus, the so-called "aridizing process" disclosed by Brookby in U.S. Pat. No. 1,371,581 and subsequent patents related thereto have disclosed the addition of a deliquescent substance such as a chloride of an alkaline earth metal into the stucco during the batch kettle calcination. However, this method is not effective with continuously calcined gypsum. Further, the addition of salt is undesirable for the reason that this hygroscopic impurity is very deleterious to board qualities such as plastic flow and bond of paper to core. It has also been long recognized in the art of batch calcination that artificial aging could be accomplished with water addition. One such attempt is described in McAnally U.S. Pat. No. 1,713,879 in which either "single boil" or "double boil" calcined gypsum was aged by placing one ton of stucco in a plaster mixing machine and adding water over a 5 to 6 minute period. Another such attempt is described in Marsh U.S. Pat. No. 2,177,668 in which calcined gypsum having a combined moisture content of about 2% (showing the presence of much active anhydrite) was exposed to a humidified gas such as air at 60% relative humidity until sufficient moisture had been supplied to the over-calcined gypsum to rehydrate the anhydrite content to the hemihydrate. The calcined gypsum so treated by these processes not only showed a reduction in consistency but also set and hardened more quickly. Thus, for example a water quenching step which reduced the consistency of the quenched calcined gypsum to a value of 56 immediately shortened the set time to 25 minutes and after aging 14 days exhibited a set of only 6 minutes. Obviously, such quick setting material is not suitable without excessive corrective reformulation for automated continuous board production, since the slurry mass would begin setting during mixing in the board slurry mixer thus resulting in poor quality board and considerable equipment shutdown and clean-up. Kinkade and McCleary in U.S. Pat. No. 3,415,910 taught that the quick set deficiency of batch quenched calcined gypsum could be overcome by quenching the calcined gypsum while the mass of calcined gypsum is still hot with considerably large quantities of water to quench the stucco and then stabilizing the material by reheating the kettle contents to about 255° F. This stabilized stucco so treated not only showed a reduction in consistency but also showed that the setting time and dispersed surface area did not vary excessively upon aging. Such a treatment requires considerable water in cooling down the "hot" stucco and also considerable utilization of energy in both initially heating the stucco before quench and also reheating the quenched stucco to stabilize it. The longer cycle time per batch for the two additional operations would require added capital investment to supply automated board lines and is energy intensive. Further, this process reduces the effective capacity of the kettles by at least 50% and would be economically disastrous for board manufacture at present fuel and added equipment costs.

One skilled in the art from the above would expect that water treated calcined gypsum would be subject to quick set and cause immediate set-up in processing lines unless stabilized as taught in Kinkade et al.

Further, attempts to adapt the water treatment alone to continuous calcination resulted in products exhibiting incomplete treatment, shortening of set time, and high energy consumption.

Thus, while these treatments have been accepted in the market place for batch operations, it has been commonly recognized that they are not suitable for continuously calcined gypsum for utilization in gypsum board manufacture under automated processes.

SUMMARY OF THE INVENTION

A principal object and advantage of the present invention is the provision of a process for continuously treating calcium sulfate hemihydrate so as to lower the water demand of that calcined gypsum.

A further object is the provision of improved calcined gypsum which exhibits lower water demand for use in gypsum board production.

Still another object is a provision of a process for treating calcined gypsum so as to substantially reduce water requirements of the calcined gypsum on subsequent use by about 20–30%; and a still further object is the provision of such a process as part of continuous gypsum board production.

The fulfillment of these and other objects and advantages of the present invention are accomplished by homogeneously blending water continuously into a flowing stream of calcined gypsum so as to incorporate about 1–8% of free water into the calcined gypsum stream; allowing the blended mass to heal for a period of about one minute to heal the calcium sulfate hemihydrate while continuously supplying the treated gypsum mass into the slurry mixer of an automated gypsum board line. In one embodiment about 50% to about 75% by weight of the calcined gypsum feed to the gypsum board production line is diverted and treated with a stream of water with homogeneous blending to add approximately 6% of free moisture into that portion of the calcined gypsum stream. The treated stream is recombined with the stream of untreated calcined gypsum with agitation to obtain a total net incorporation of about 3–4% free water into the total reblended stream. The recombined stream is allowed to heal for approximately two minutes before entering the slurry mixer of the automated gypsum board production. This produces the effect of uniformly healed material even though only about half of the total was initially treated with water. Calcined gypsum is a highly dynamic system which changes in relation to time, temperature and humidity. The industry has spent considerable time and money to obtain uniform consistency through moisture venting, bin storage rotation and the like; but such efforts have not achieved the great reduction in dispersed consistency accomplished by the above embodiment. The result above provides uniform set and uniform greatly reduced water demand not realized before in typical board operations.

DESCRIPTION OF THE PREFERRED EMBODIMENTS

Figure 1:
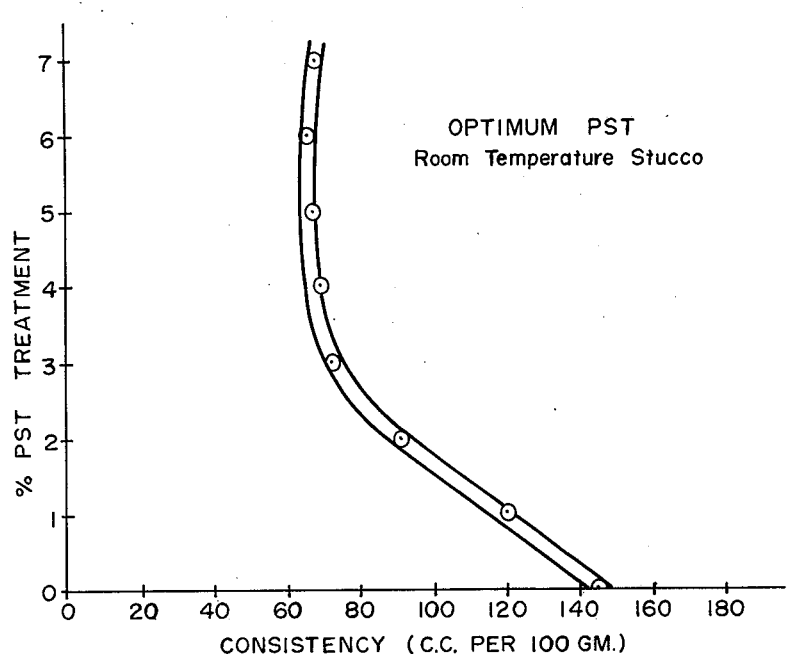
FIG. 1 is a graph illustrating the relationship between dispersed consistency of the calcined gypsum and the amount of water addition treatment (labeled as "PST").

Although the capacity for water "aging" of plaster has been known for some time in batch processes, it has not been utilized on a continuous basis because of the deleterious side effect of quick set normally associated with water-treated stucco that has not been reheated, and material handling problems. Also, no one has found a process for accomplishing this without plugging up the equipment. Attempting to incorporate the proper amount of water in ordinary mixing equipment results in serious lumping and build up of the lumps on the equipment. It was therefore unexpected that by splitting the stream of feed to the gypsum board production equipment and treating only about half of the stream by metering in small amounts of water (rate of about two gallons of water per minute to approximately five tons per hour of continuous board stucco feed with homogeneous mixing) and then recombining this stream with the untreated stream in an ordinary screw-conveyor, such a treatment would result in a uniform homogeneous blending of material, without lumping and without physical handling difficulties, and resulting, in practical terms, in the removal of either gallons of water per minute from the water requirements for the slurry and the board mixing apparatus.

The calcined gypsum ingredient for treatment in the present process is not critical and any conventional calcined gypsum feed for the board machine may be utilized. It is preferred that the feed calcined gypsum be any continuously produced stucco having a seven second dispersed consistency of about 100–160 cc; but of course this may vary depending upon manufacturing procedure well known to those skilled in the art.

This invention will now be further described by reference to specific examples for the purpose of further illustrating and disclosing the operation of the present process and the improved calcined gypsum product produced. It is to be understood that the examples are by way of illustration only and in no way are to be construed as limitations on the present invention.

While the hereinabove describes particularly preferred embodiments, it is obvious to one skilled in the art that various changes and modifications may be made in the practice of this invention. For example, customary accelerators, retarders and mixtures thereof for calcium sulfate hemihydrate may be added in customary amounts for their known effects. While various amounts of water, various healing times and various portions of the total stucco board machine feed have been set forth hereinabove, it is obvious that these may vary considerably depending upon the rate of production of the particular board plant and like conditions.

EXAMPLE 1

A portion of the calcined gypsum being conveyed from the storage bin to the gypsum board slurry mixer was diverted and continuously passed through a medium energy shearing mixer. The dry calcined gypsum, having a temperature of about 150°–170° F., entered one side of the shearing mixing vessel at a rate of 5 tons per hour (which is approximately 50% of the stream) while a small stream of water was metered into the center of the shearing mixer at a rate of two gallons of water per minute. Shearing blending was accomplished by mounting a motor-boat type of propeller, ten inches in diameter, in a cylindrical container about twelve inches in diameter and about fifteen inches high. The propeller is operated at about 350 revolutions per minute and the mixing action is such that as the water enters and blends with the calcined gypsum, they are swept downward and around the container and then up and out the overflow opening at the top of the container. The overflowing material then rejoined the rest of the stream and was passed on to the gypsum board slurry mixer for mixing with water and the production of gypsum board. About two gallons of water per minute had been added to the calcined gypsum during the treating operation, subsequently, the water addition rate to the gypsum board slurry mixer was reduced at a rate of 7 gallons of water per minute. This gave a net gain of 5 gallons per minute as water not needed to provide satisfactory dispersed consistency to the treated gypsum. As a result it was possible to reduce kiln temperatures in drying the wet gypsum board about 40° F. and still maintain line speed. The amount of water evaporated to dry the hydrated gypsum was reduced about 20%.

EXAMPLE 2

In each of eight different tests, approximately 4000 grams of room temperature calcined gypsum was treated with various amounts of water.

Approximately 20 minutes after treatment, the dispersed consistency was determined and the results defined the curve plotted in FIG. 1. This plot indicates that dispersed consistency is reduced as the percent of treatment is increased and that this reduction becomes optimum at about 3½ percent of treatment.

EXAMPLE 3

A series of samples of calcined gypsum were treated with 3% water in a manner similar to Example 2.

Figure 2:
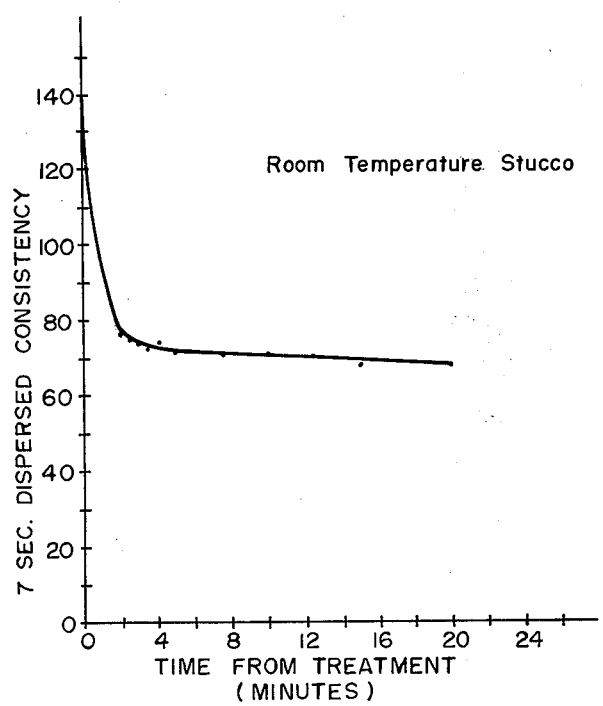
FIG. 2 is a graph illustrating the effect on dispersed consistency with time from treatment.

The dispersed consistency or water demand was determined at strictly controlled time periods measured from the time of treatment to the time of test. Results of determinations show that the treatment is more effective as the time period is lengthened with most of the final water demand reduction being obtained within the first 2 minutes and with near maximum being obtained within 20 minutes as shown in FIG. 2 attached.

What is claimed is:

1. A continuous process for manufacturing gypsum board characterized by using a reduced amount of water to fluidize calcined gypsum in forming the gypsum slurry which is fed to the board making machinery and therefore requiring less energy to dry the wet board which comprises:
   (1) supplying calcined gypsum feed to be conveyed to a gypsum slurry mixer;
   (2) diverting a portion of said calcined gypsum to a blender, said portion being at least about 50% by weight of the total calcined gypsum feed;
   (3) blending a small amount of water with said calcined gypsum portion in said blender, said water ranging from about 1% to about 8% by weight of the total calcined gypsum feed;
   (4) recombining the wetted diverted portion of said calcined gypsum with the dry, undiverted portion to form a homogeneous mixture of calcined gypsum;
   (5) allowing the recombined homogeneous mixture of calcined gypsum to heal;
   (6) feeding the healed mixture of calcined gypsum to the gypsum slurry mixer;
   (7) adding additional water to the healed mixture of calcined gypsum in the slurry mixer, said additional water being added in an amount sufficient to provide from about 65 to about 85 parts of water, including water added in the blender, per 100 parts of the calcined gypsum, which results in reducing the amount of water to be evaporated from the wet board;
   (8) mixing the healed mixture of calcined gypsum and water in the slurry mixer to form a homogeneous slurry;
   (9) feeding the slurry to a gypsum board making machine to form a wet gypsum board;
   (10) passing the wet gypsum board to a kiln to dry the board; and
   (11) recovering dry gypsum board consisting essentially of calcium sulfate dihydrate.

2. The process of claim 1 in which the small amount of water blended with the calcined gypsum portion in step (3) ranges from about 2% to about 16% by weight of the calcined gypsum portion with which it is blended.

3. The process of claim 1 in which the portion of calcined gypsum diverted to the blender ranges from about 50% to about 75% by weight of the total calcined gypsum feed.

4. The process of claim 1 in which the temperature of the kiln used to dry the board in step (10) is substantially reduced from the normal kiln operating temperature required to dry a wet gypsum board containing 85 to 100 parts of water per 100 parts of the calcined gypsum at the same rate of passing the wet board to the kiln as a result of the lower water content in the gypsum slurry.

5. The process of claim 1 in which the rate the wet gypsum board is passed through the kiln in step (10) is faster than the normal rate required to dry a wet gypsum board containing 85 to 100 parts of the calcined gypsum at the same operating temperature as a result of the lower water content in the gypsum slurry.

6. The process of claim 1 in which the water content of the recombined homogeneous mixture of calcined gypsum in step (4) is about 3% free water by weight of calcined gypsum.

7. A continuous process for manufacturing gypsum board characterized by using a reduced amount of water to fluidize calcined gypsum in forming the gypsum slurry which is fed to the board making machinery and therefore requiring less energy to dry the wet board which comprises:
   (1) supplying calcined gypsum feed to be conveyed to a gypsum slurry mixer;
   (2) conveying the calcined gypsum feed to a blender;
   (3) blending a small amount of water with said calcined gypsum, said water ranging from about 1% to about 8% by weight of the calcined gypsum feed;
   (4) allowing the wetted calcined gypsum to heal;
   (5) feeding the healed calcined gypsum to the gypsum slurry mixer;
   (6) adding additional water to the healed calcined gypsum in the slurry mixer, said additional water being added in an amount sufficient to provide from about 65 to about 85 parts of water, including water added in the blender, per 100 parts of the calcined gypsum which results in a substantially reduced amount of water to be evaporated from the wet board;
   (7) mixing the healed calcined gypsum and water in the slurry mixer to form a homogeneous slurry;
   (8) feeding the slurry to a gypsum board making machine to form a wet gypsum board;
   (9) passing the wet gypsum board to a kiln to dry the board; and
   (10) recovering dry gypsum board consisting essentially of calcium sulfate dihydrate.

8. The process of claim 7 in which the temperature of the kiln used to dry the board in step (9) is substantially reduced from the normal kiln operating temperature required to dry a wet gypsum board containing 85 to 100 parts of water per 100 parts of the calcined gypsum at the same rate of passing the wet board to the kiln as a result of the lower water content in the gypsum slurry.

9. The process of claim 7 in which the rate the wet gypsum board is passed through the kiln in step (9) is faster than the normal rate required to dry a wet gypsum board containing 85 to 100 parts of water per 100 parts of the calcined gypsum at the same operating temperature as a result of the lower water content in the gypsum slurry.

10. A continuous process for manufacturing gypsum board characterized by using a reduced amount of water to fluidize calcined gypsum in forming the gypsum slurry which is fed to the board making machinery whereby a kiln used to remove water from the wet gypsum board is operated at a lower temperature which comprises:

(1) supplying calcined gypsum feed to be conveyed to a gypsum slurry mixer;
(2) diverting from about 50% to about 75% by weight of said calcined gypsum to a blender;
(3) blending from about 2% to about 16% by weight of water with said calcined gypsum portion in said blender whereby the amount of water by weight of the total calcined gypsum feed ranges from about 1% to about 8% by weight;
(4) recombining the wetted diverted portion of said calcined gypsum with the dry portion to form a homogeneous mixture of calcined gypsum;
(5) allowing the recombined homogeneous mixture of calcined gypsum to heal;
(6) feeding the healed mixture of calcined gypsum to the gypsum slurry mixer;
(7) adding additional water to the healed mixture of calcined gypsum in the slurry mixer, said additional water being added in an amount sufficient to provide from about 65 to about 85 parts of water, including water added in the blender, per 100 parts of the calcined gypsum, which results in reducing the amount of water to be evaporated from the wet board by at least about 20%;
(8) mixing the healed mixture of calcined gypsum and water in the slurry mixer to form a homogeneous slurry;
(9) feeding the slurry to a gypsum board making the machine to form a wet gypsum board;
(10) drying the wet gypsum board in a kiln whose operating temperature is substantially reduced from the temperature required to dry a wet gypsum board containing 85-100 parts of water per 100 parts of the calcined gypsum at the same rate of passing the wet board to the kiln as a result of the lower water content in the gypsum slurry; and
(11) recovering dry gypsum board consisting essentially of calcium sulfate dihydrate.

11. A continuous process for manufacturing gypsum board characterized by using a reduced amount of water to fluidize calcined gypsum in forming the gypsum slurry which is fed to the board making machinery whereby the rate of passing the wet gypsum board to a drying kiln is increased which comprises:

(1) supplying calcined gypsum feed to be conveyed to a gypsum slurry mixer;
(2) diverting from about 50% to about 75% by weight of said calcined gypsum to a blender;
(3) blending from about 2% to about 16% by weight of water with said calcined gypsum portion in said blender whereby the amount of water by weight of the total calcined gypsum feed ranges from about 1% to about 8% by weight;
(4) recombining the wetted diverted portion of said calcined gypsum with the dry portion to form a homogeneous mixture of calcined gypsum;
(5) allowing the recombined homogeneous mixture of calcined gypsum to heal;
(6) feeding the healed mixture of calcined gypsum to the gypsum slurry mixer;
(7) adding additional water to the healed mixture of calcined gypum in the slurry mixer, said additional water being added in an amount sufficient to provide from about 65 to about 85 parts of water, including water added in the blender, per 100 parts of the calcined gypsum, which results in reducing the amount of water to be evaporated from the wet board by at least about 20%;
(8) mixing the healed mixture of calcined gypsum and water in the slurry mixer to form a homogeneous slurry;
(9) feeding the slurry to a gypsum board making machine to form a wet gypsum board;
(10) passing the wet gypsum board to a kiln at a rate faster than the normal rate required to dry a wet gypsum board containing 85-100 parts of water per 100 parts of the calcined gypsum at the same operating temperature as a result of the lower water content in the gypsum slurry; and
(11) recovering dry gypsum board consisting essentially of calcium sulfate dihydrate.

* * * * *